United States Patent
Honnons et al.

(10) Patent No.: US 9,441,655 B2
(45) Date of Patent: Sep. 13, 2016

(54) ALARM METHOD FOR AVOIDING INAPPROPRIATE RUDDER BAR ACTUATION

(71) Applicant: Airbus Operations (SAS), Toulouse (FR)

(72) Inventors: Bernard Honnons, Toulouse (FR); Stephane Boissenin, Frouzins (FR)

(73) Assignee: AIRBUS OPERATIONS (SAS), Toulouse (FR)

( * ) Notice: Subject to any disclaimer, the term of this patent is extended or adjusted under 35 U.S.C. 154(b) by 375 days.

(21) Appl. No.: 14/035,438

(22) Filed: Sep. 24, 2013

(65) Prior Publication Data
US 2014/0234019 A1    Aug. 21, 2014

(30) Foreign Application Priority Data

Sep. 27, 2012   (FR) ...................... 12 59072

(51) Int. Cl.
*F16B 5/04*      (2006.01)
*B64C 13/10*   (2006.01)
*B21J 15/02*   (2006.01)

(52) U.S. Cl.
CPC ................. *F16B 5/04* (2013.01); *B21J 15/02* (2013.01); *B64C 13/10* (2013.01); *Y10T 29/49956* (2015.01); *Y10T 403/4966* (2015.01)

(58) Field of Classification Search
CPC ......... B64C 13/00; B64C 13/04; B64C 9/00; B64C 13/10; B64C 19/02; B64D 45/00; B21J 15/02; F16B 5/04; G01C 23/00; G01C 23/005; G05D 1/00; G05D 1/0066; G05D 1/08; G05D 1/0816; G05D 1/0825; Y10T 403/4966; Y10T 29/49956
USPC ........ 340/945, 963, 967; 29/525.06; 244/39, 244/75.1, 76 R, 87, 184, 194, 211, 220, 221, 244/234, 235, 236; 403/282
See application file for complete search history.

(56) References Cited

U.S. PATENT DOCUMENTS

| 2002/0022910 | A1  | 2/2002 | Kubica et al. |
| 2010/0250034 | A1* | 9/2010 | Bouchard ............ G07C 5/0825 701/14 |
| 2012/0205495 | A1* | 8/2012 | Walter ................. G05D 1/0066 244/234 |

FOREIGN PATENT DOCUMENTS

| EP | 1160158 | 12/2001 |
| EP | 2490091 | 8/2012 |

OTHER PUBLICATIONS

Airbus, A318/A319/A320/A321-Yaw Control, 2007, pp. 77-78.*
French Search Report, May 23, 2013.

* cited by examiner

*Primary Examiner* — Brian Wilson
(74) *Attorney, Agent, or Firm* — Greer, Burns & Crain, Ltd.

(57) ABSTRACT

A method for producing a connector, in particular for repair, in particular in the field of aviation and aerospace, including the steps of: providing a base layer; attaching a first layer of fiber composite material having a first rigidity to the base layer; attaching a second layer of fiber composite material having a second rigidity to the first layer, offset therefrom, the second rigidity being greater than the first rigidity; and riveting the first layer to the base layer and riveting the second layer to the first layer and to the base layer.

13 Claims, 1 Drawing Sheet

ALARM METHOD FOR AVOIDING INAPPROPRIATE RUDDER BAR ACTUATION

CROSS-REFERENCES TO RELATED APPLICATIONS

This application claims the benefit of the French patent application No. 20120059072 filed on Sep. 27, 2012, the entire disclosures of which are incorporated herein by way of reference.

BACKGROUND OF THE INVENTION

The present invention relates to an alarm method and device against inappropriate actuation of an aircraft rudder bar by a pilot during directional control of the aircraft.

It is known that directional control of an aircraft is mainly ensured by an articulated rudder, able to rotate in two opposite directions of rotation between an aerodynamically neutral position and a stopped position of maximum rotation. To this end, the rudder is controlled by a mobile control facility (rudder bar) available to the aircraft pilot. This facility is generally equipped with two pedals, the respective depression of which causes the facility to travel in two opposite directions, associated, respectively, with the two opposite directions of rotation of the rudder. In particular, this rudder bar controls the rotation of the rudder in such a way that the amplitude of the rotation of said rudder depends on the amplitude of the rudder bar travel. Consequently, a depression of the right pedal, for example, conveys the wish of the pilot to cause a yawing moment tending to move the nose of the aircraft to the right, this moment being obtained by a deflection of the rudder to the right. Thus, in a few special cases, the pilot can act on the rudder bar with the aim of modulating the aerodynamic forces being applied to the aircraft, so as to modify or control the lateral path. These special cases are limited, like the control of engine failure and the alignment maneuver, to situations during a crosswind landing.

Nevertheless, this steering facility being available to the pilot in all the phases of flight, it can occur that, in especially dynamic and unusual situations, the pilot actuates the rudder bar in a wholly inappropriate manner. This inappropriate actuation, in these phases of flight, can potentially generate excessive loads on the vertical stabilizer.

Furthermore, to protect the aircraft, when the speed of the aircraft exceeds a speed threshold, it is possible to limit the rudder rotation in a manner inversely proportional to the speed of the aircraft, i.e. to make the rudder's TLU (Travel Limiter Unit) stop dependent on the speed of the aircraft, with the aim of limiting the stresses to which said aircraft is subjected at high speeds and, thus, of enabling the performance of yaw maneuvers, including at high speed.

It can however occur, even with the travel limiter device, that actuation of the rudder bar inversely coordinated with the position of the rudder be such that the aircraft can experience excessive loads on the vertical stabilizer.

The present invention has the object of preventing such a risk to the aircraft during directional control of the aircraft. It concerns an alarm method making it possible to alert a pilot to an inappropriate actuation of the aircraft rudder bar.

SUMMARY OF THE INVENTION

To this end, according to the invention, said alarm method against inappropriate actuation of a rudder bar by a pilot, said rudder bar being capable of being moved in two opposite directions by the pilot to control a rudder, said rudder being able to turn in two directions of rotation up to a maximum rotation position in each of the two directions, one of the directions of the rudder bar being associated with one of the directions of rotation of the rudder and the other direction of the rudder bar being associated with the other direction of rotation of the rudder, is noteworthy in that:

a) the current position of the rudder bar is monitored in order to be able to detect when the rudder bar reaches a so-called extreme position, for which the rudder reaches one of its maximum rotation positions; and b) when it is detected that the rudder bar reaches an extreme position, for which the rudder therefore reaches one of its maximum rotation positions, a check is made to verify whether, within a predetermined time period after having reached this position, the following alarm activation conditions are met: the rudder successively returns to a neutral position and re-exits this neutral position again; and c) when said alarm activation conditions are met during said predetermined time period, an alarm is triggered.

Thus, thanks to the invention, when the pilot performs the series of specific actuations of the rudder bar resulting in the rudder being successively brought, during a very short predetermined time period, preferably three seconds, from an extreme position (TLU stop reached by the rudder) to a neutral position, then on exiting this neutral position (and this whatever the direction of exit), he is automatically warned of the non-conformity of such a maneuver, which allows him or her to be aware of this situation and act accordingly.

Advantageously, in step a):

a current rudder bar position value is received, emitted by at least one conventional ELAC-type system which is associated with said rudder bar and which expresses this position value in a rudder unit; and the current rudder bar position value, expressed in a rudder unit, is compared to a position value representative of the maximum rotation position of the rudder for the current speed of the aircraft, said maximum rotation position depending on the speed of the aircraft.

In the context of the present invention, the fact that a position value of the rudder bar is expressed in a rudder unit means that the rudder bar's position is taken into account, but that this position is defined, not as an angle of rotation of the rudder bar, but as a unit (particularly a deflection angle value) which illustrates the amplitude of the deflection of the rudder, generated by this position of the rudder bar.

Furthermore, advantageously in step b), to verify the position of the rudder in relation to the neutral position, a current rudder position value, expressed in a rudder unit, is compared to a current neutral position value. In the context of the present invention, this current neutral position value corresponds to a fraction of the current value of the maximum rotation position, preferably to half of the current value of the maximum rotation position.

The rudder is thus considered to be:

located in the neutral position, when the current position value of the rudder bar, expressed in a rudder unit, is less than or equal to said neutral position value; and exited from the neutral position, when the current position value of the rudder bar, expressed in a rudder unit, is greater than said neutral position value.

Furthermore, advantageously, it is possible to limit said neutral position value to predetermined values. Such a limitation makes it possible to guarantee that given the sampled data from ELAC (supplying the position of the pedals) and that acquired by a FAC (Flight Augmentation Computer), the neutral position can be detected whatever stress the pilot applies to the pedals.

Moreover, advantageously when an autopilot system of the aircraft is engaged, it is detected at step a) that the rudder has reached a maximum rotation position, when additionally the current position of the rudder bar exceeds a predetermined value, for example 5°.

Furthermore, advantageously, the triggering of the alarm is inhibited when at least one of the following conditions is met:
the aircraft speed is below a predetermined speed;
an engine failure of the aircraft is detected; and
no valid rudder bar position value is available.

When an alarm is triggered, it can be maintained during a time interval of predetermined duration, at least approximately equal to five seconds.

Moreover, this alarm may be triggered in the form of a visual or sound signal for the attention of the pilot.

The present invention also relates to an alarm device against inappropriate actuation of a rudder bar by the pilot of an aircraft, particularly a cargo airplane.

To this effect, according to the invention, said alarm device is noteworthy in that it comprises:
means for providing the current position of the rudder bar
means for providing a maximum rotation position of the rudder;
means for monitoring the current position of the rudder bar so as to be able to detect when the rudder bar reaches a so-called extreme position, for which the rudder reaches one of its maximum rotation positions, and when such a situation is detected, to verify whether, within a predetermined time period after having reached this extreme position, the following alarm activation conditions are met: said rudder successively returns to a neutral position and re-exits this neutral position; and
for alarm means emitting an alarm when said alarm activation conditions are met during said predetermined time period.

Preferably, said alarm means emit, simultaneously, a visual alarm and a sound alarm.

Furthermore, in a particular embodiment, said alarm device also comprises means for inhibiting said alarm means.

The device according to the present invention has the aim of detecting mainly particular positions of the pedals of the rudder bar making it possible to determine that a TLU stop has been reached by the rudder, then that, within a predetermined time period (preferably three seconds), this rudder has returned to neutral and then re-exited from neutral in any direction.

The present invention also relates to:
an aircraft directional control system, comprising at least one rudder bar that can be actuated by a pilot of the aircraft, means for generating an electric command signal representing the position of the rudder bar, and computing means which receive this electric command signal and automatically generate control commands which are transmitted to actuation means of a rudder of the aircraft; and/or
an aircraft, in particular a cargo airplane, which are equipped with an alarm device, such as the one previously mentioned.

BRIEF DESCRIPTION OF THE DRAWINGS

The figures of the appended drawing will clearly demonstrate how the invention may be embodied. In these figures, identical references denote similar elements.

DETAILED DESCRIPTION OF THE PREFERRED EMBODIMENTS

Figure 1:
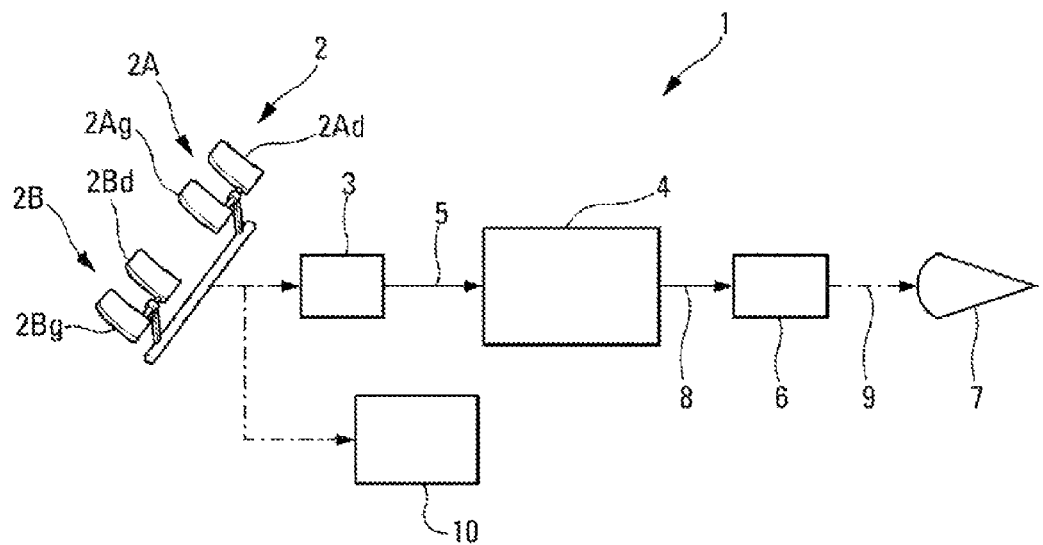
FIG. 1 is the block diagram of an embodiment of an aircraft directional control system comprising an alarm device according to the invention.
Figure 2:
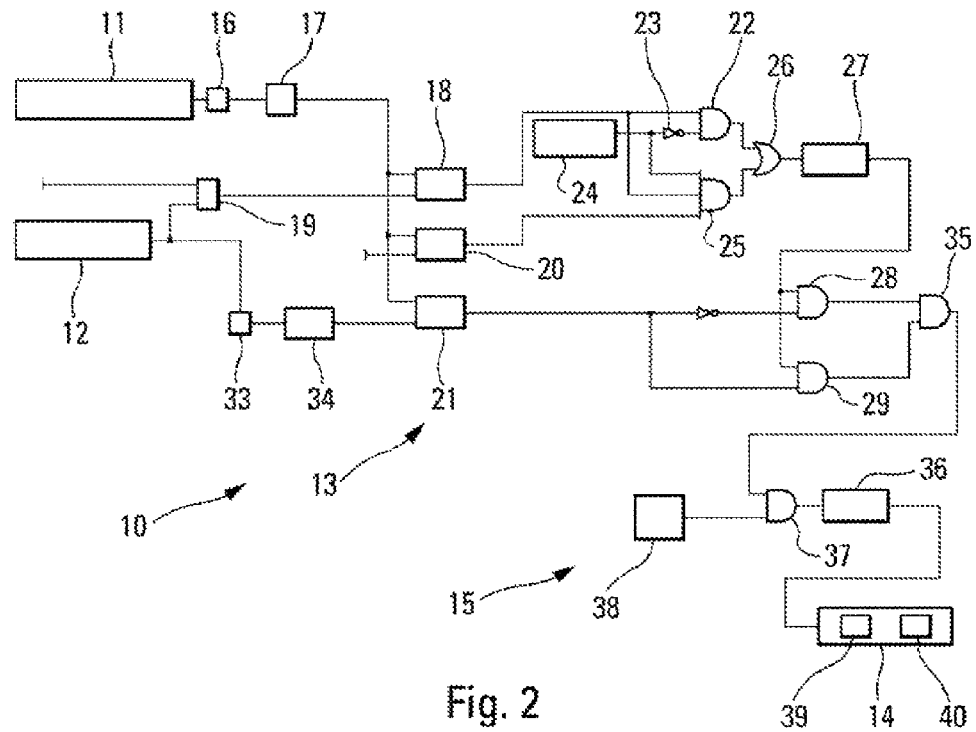
FIG. 2 is the block diagram of an alarm device according to the present invention.

The device 10 according to the invention and represented diagrammatically in FIG. 2 is intended to alert a pilot in the event of an inappropriate actuation by this pilot of a rudder bar 2 of an aircraft, in particular of a cargo airplane. This device 10 is associated with a conventional directional control system 1 of the aircraft, which is represented diagrammatically in FIG. 1.

This directional control system 1 comprises, conventionally and generally:
said rudder bar 2 (embodied in the form of pedals), of which a first unit 2A may be actuated by the pilot (pedals 2Ar, 2Al), and of which a second unit 2B linked to said first unit 2A may be actuated by the co-pilot (pedals 2Br, 2Bl);
means 3 associated with said rudder bar 2, which determine its position and which generate an electric command signal representative of this position;
a flight control computer 4 which receives this electric command signal via an electrical connector 5 and which generates control commands using the latter; and
actuation means 6 of a rudder 7 of the aircraft, to which are transmitted these control commands via an electrical connection 8. These actuation means 6 deflect the rudder 7 (as illustrated by a connection 9 in dot-dash lines) by a deflection value representative of the control commands thus received.

The rudder 7 is articulated and can turn in two opposite directions of rotation, around a vertical axis. It is able to pivot, in each of the two directions of rotation, between an aerodynamically neutral position and a maximum rotation position.

The rudder bar 2 is intended, when the aircraft taxis on the ground or is in flight, to control the rotation of the rudder 7, around its axis, in both directions. To this end, each unit 2A and 2B of the rudder bar 2 is able to turn around a vertical axis following two opposite directions of rotation which are associated respectively with the two directions of rotation of the rudder 7. In order to do this, each unit 2A and 2B of the rudder bar 2 is provided with two pedals respectively left (2Al, 2Bl) and right (2Ar, 2Br), a depression of the left pedal being able to cause a rotation of the rudder bar in the direction of rotation associated with the leftward direction of rotation of the rudder 7, whereas a depression of the right pedal is able to cause a rotation of said rudder bar in the direction of rotation associated with the rightward direction of rotation of the rudder 7.

The rudder bar 2 can thus pivot about its axis, between a position for which there is no command to rotate the rudder 7 and a maximum position for which the rotation of said rudder bar 2 is at a maximum. Between these two positions, the rudder bar 2 goes through a position (referred to as extreme in the context of the invention) for which the position of maximum rotation (to the left or the right) of the rudder 7 is reached.

According to the invention, said device 10 comprises, as represented in FIG. 2:

- means 11 for providing the current position of the rudder bar 2;
- means 12 for providing a maximum rotation position (TLU stop) value of the rudder 7;
- means 13 for monitoring the current position of the rudder bar 2 in such a way as to detect when the rudder bar 2 reaches an extreme position, for which the rudder 7 reaches one of its positions of maximum rotation, and when such a situation is detected for verifying whether, in a predetermined time period (for example three seconds) after having reached this extreme position, the following alarm activation conditions are met: said rudder 7 successively returns to a neutral position and re-exits this neutral position; and
- alarm means 14 for emitting an alarm when said alarm activation conditions are met during said predetermined time period.

When they are triggered, said alarm means 14 preferably emit, simultaneously, a visual alarm and a sound alarm, as specified below.

Furthermore, in a particular embodiment, said device 10 comprises, additionally, means 15 for inhibiting said alarm means 14.

Thus, when a pilot of the aircraft performs the series of particular actuations of the rudder bar 2 resulting in the rudder 7 being successively brought, within at the most a very short predetermined time, for preference three seconds, from an extreme position (TLU stop reached by the rudder 7) to a neutral position, then on the exit from this neutral position (and this whatever the direction of exit), the device 10 automatically warns the pilot, via the alarm means 14, of the non-compliance of such a maneuver, which allows him or her to gain awareness of this situation and to act accordingly.

The means 11 that provide a value for the rudder bars current position include a unit comprising at least one ELAC-type system. Usually, such a unit comprises two ELAC systems, each of which carries out the acquisition and monitoring of two sensors, each of which detects the position of the pedals 2A of the pilot and the other of which detects the position of the pedals 2B of the co-pilot. The values of the two sensors of each ELAC system are then compared. If an inconsistency is detected or an ELAC system presents a malfunction, the position value of the ELAC system is not considered valid.

The current position value of the rudder bar 2, provided by such a unit, (means 11), has already been transcribed as a rudder position. In fact, it is expressed in a rudder unit, that is to say in a unit (particularly a deflection angle value) that indicates the amplitude of the deflection of the rudder 7, generated by the current position of the rudder bar 2. This value is then retained under its absolute value (using means 16.)

Moreover, to obtain a homogenous detection threshold over the whole range of variation of the TLU, means 17 are provided to correct this pedal position, as a function of measures (rudder bar cycles) carried out on the aircraft during production (on each type of aircraft, since the characteristics of the linkages and the elasticity of the cables differ.)

This current position value, thus corrected, is then used by the means 13 which are preferably incorporated into an FAC (or Flight Augmentation Computer), which usually already uses such a current position value received from the ELAC systems, which makes it possible to simplify the implementation of the present invention.

More precisely, this current position value is addressed to a binary comparator 18 of A>B type which compares this current value to a value obtained by a summing amplifier 19. This summing amplifier 19 adds a predetermined value (generally 1°) to the TLU value (representing the current maximum rotation position of the rudder 7) generated by said means 12 in order to avoid premature detection. Said maximum rotation position depends on the (current) speed of the aircraft.

In the example of FIG. 2, this current position value is also addressed:

- to a comparator 20 of A>B type, which compares this current value to a predetermined value, preferably 5°, as specified below; and
- to a comparator 21, also of A>B type, which compares this current value to a neutral position value, as specified hereinafter.

The output from the comparator 18 is addressed:

- on the one hand, to an input of an AND logic gate 22, the other input of which is linked to a NOT logic element 23 which receives from an autopilot system 24 the information that the latter has been activated. The logic gate 22 is thus set to the value 1 if, simultaneously, said current position value is higher than said current TLU value and the autopilot system 24 is not engaged; and
- on the other hand, to an input of an AND logic gate 25, of which the two other inputs are connected to the output of the autopilot system 24 and to the output of the comparator 20 respectively. The latter elements are applied in the special situation where the autopilot system 24 is engaged.

Thus, when the autopilot system 24 is engaged, the detection "TLU reached" is maintained to enable the possible detection of a sequence of pedal actions beginning under automatic pilot. In this operating mode, the stiffness of the directional artificial feel, which is responsible for the strain experienced while deflecting the pedals, is considerably increased by the activation of a solenoid. Given this stiffening and the elongation under load of the control cables between the pedals and the rudder 7, the travel of the rudder 7 begins at a larger deflection of the pedals. As a consequence, so as to desensitize the alarm when the autopilot system 24 is engaged as regards involuntary actions on the pedals while cruising, when the TLU alarm thresholds are low, a minimum threshold of pedal travel, preferably of 5°, is added to this detection "TLU reached".

The outputs of the logic gates 22 and 25 are addressed to an OR logic gate 26 which is set to the value "1" to indicate that the rudder 7 has reached the TLU stop, when:

- either the current position value of the rudder bar 2 exceeds by 1 degree the value of the TLU stop, for which the rudder 7 reaches one of its maximum rotation positions;
- or the particular conditions following the engagement of the autopilot system 24 have been met.

When the OR logic gate 26 switches to 1, checks are implemented during a predetermined period of time, preferably three seconds, as indicated by an element 27. This OR logic gate 26 is connected to the inputs of two AND logic gates 28 and 29.

Thus the following checks are performed:

- on the one hand, whether the rudder 7 is brought to a neutral position using the AND logic gate 28, the other input of which is connected to a NOT logic element which is additionally connected to the output of the comparator 21. The output of the comparator 21 switches to 1 (current position value higher than the neutral position value) when the rudder 7 is outside the neutral position; and on the other hand, whether the rudder 7 has again exited from the neutral position, using the AND logic gate 29, the other input of which is connected directly to the output of said comparator 21.

The comparator 21 receives at its input a neutral position value which is calculated by an element 33. This element 33 calculates a neutral position value which corresponds to a fraction of the maximum rotation position value of the rudder 7, received from the means 12, preferably half of this maximum rotation position value.

A means 34 of setting a particular limit is also provided. Since the TLU position varies with the aircraft speed, the neutral position has been arbitrarily set to the theoretical TLU value divided by 2. Given the variation of the TLU position, this detection of the neutral has been limited to 3° per maximum value and to 1.5° per minimum value. This minimum value guarantees that given the samples from ELAC (providing the position of the pedals) and FAC (for acquisition) the neutral position can be detected whatever the pressure of the pilot on the pedals.

The two AND logic gates 28 and 29 are connected to an AND logic gate 35 which activates the alarm means 14 so that they trigger an alarm when its output is set to 1, i.e. when the outputs of gates 28 and 29 are both set to 1. This situation occurs when, after having reached the TLU stop, the rudder 7 is returned to the neutral position (gate 28) and has re-exited it (gate 29), doing so during a predetermined time period (element 27). This alarm generated by the means 14 which are, for example, part of a central Flight Warning Computer, is maintained for a predetermined time period, for example five seconds, as illustrated by an element 36.

The alarm triggered by the means 14 can manifest in the form of:
- a visual signal, emitted by signalization means 39 (such as a screen, LEDs, etc.) receiving the command to trigger said alarm; and/or
- a sound signal, emitted by sound-emitting means 40 receiving the command to trigger said alarm; and/or yet any other type of suitable signal.

Said alarm means 14 preferably emit, simultaneously:
- a sound alarm, for example in the form of a double emission by a synthetic voice of a message of the type "Stop rudder input" demanding the cessation of the rudder bar actuation; and
- a visual alarm, in the form of a flashing light signal.

Additionally, the inhibition means 15 comprise conditions that are transmitted to the input of an AND logic gate 37, which is arranged between gate 35 and element 36, and the operation of which inhibits the alarm. In a schematic and simplified manner, the various inputs of the AND logic gate 37 are schematized by an element 38 in FIG. 2. Preferably, said inhibition means 15 inhibit the triggering of the alarm when at least one of the following conditions is met:
- aircraft speed (particularly of CAS type) is below a predetermined speed threshold;
- a failure of at least one engine of the aircraft is detected in the usual manner; and
- no valid position value of the rudder bar 2 is available.

As is apparent from the foregoing specification, the invention is susceptible of being embodied with various alterations and modifications which may differ particularly from those that have been described in the preceding specification and description. It should be understood that I wish to embody within the scope of the patent warranted hereon all such modifications as reasonably and properly come within the scope of my contribution to the art.

The invention claimed is:

1. An alarm method for avoiding inappropriate actuation a rudder bar of an aircraft by a pilot, said rudder bar configured to be moved in two opposite directions by the pilot to control a rudder, said rudder being able to turn in two directions of rotation up to a maximum rotation position in each of the two directions of rotation, one of the two opposite directions of the rudder bar being associated with one of the directions of rotation of the rudder and the other direction of the rudder bar being associated with the other direction of rotation of the rudder, comprising the steps:
    monitoring a current rudder bar position value of the rudder bar to detect when the rudder bar reaches an extreme position, that is, when the rudder reaches one of its maximum rotation positions;
    detecting that the rudder bar reaches the extreme position;
    determining whether, within a predetermined time period after the detection of reaching the extreme position, the following alarm activation conditions are met:
        the rudder successively returns to a neutral position and the rudder re-exits from the neutral position in any direction;
    verifying the current position of the rudder in relation to the neutral position;
    setting a predetermined limit on a neutral position value for detection of the neutral position;
    comparing the current rudder bar position value of the rudder bar to the neutral position value which corresponds to a fraction of a position value representative of the maximum rotation position of the rudder; and
    triggering an alarm when said alarm activation conditions are met during said predetermined time period based on the comparison of the current rudder bar position value and the neutral position value.

2. The method as claimed in claim 1, wherein in the monitoring step, receiving the current rudder bar position value, emitted by at least one system associated with said rudder bar and which expresses the current rudder bar position value of the rudder bar in a rudder unit.

3. The method as claimed in claim 1, wherein in the monitoring step, comparing the current rudder bar position value, expressed in a rudder unit, to the position value representative of the maximum rotation position of the rudder, said maximum rotation position of the rudder depending on a current speed of the aircraft.

4. The method as claimed in claim 3, wherein when an autopilot system of the aircraft is engaged, the detection at the monitoring step that the rudder bar has reached the extreme position occurs when additionally the current rudder bar position value of the rudder bar, expressed in the rudder unit, exceeds a predetermined value.

5. The method as claimed in claim 1, including the step of inhibiting the triggering of the alarm when at least one of the following conditions is met:
    an aircraft speed is below a predetermined speed;
    an engine failure of the aircraft is detected;
    no valid rudder bar position value is available.

6. The method as claimed in claim 1, wherein, when the alarm is triggered, said alarm is maintained during a time interval of a duration at least approximately equal to five seconds.

7. The method as claimed in claim 1, wherein the alarm is triggered in the form of a visual signal for the attention of the pilot.

8. The method as claimed claim 1, wherein the alarm is triggered in the form of a sound signal for the attention of the pilot.

9. An alarm device for avoiding inappropriate actuation of a rudder bar of an aircraft by a pilot, said rudder bar configured to be moved in two opposite directions by the pilot to control a rudder, said rudder being able to turn in two directions of rotation up to a maximum rotation position in each of the two directions of rotation, one of the two opposite directions of the rudder bar being associated with one of the directions of rotation of the rudder and the other direction of the rudder bar being associated with the other direction of rotation of the rudder, comprising:
   at least one Elevator Aileron Computer (ELAC) system, configured to provide a current rudder bar position value of the rudder bar;
   a Travel Limiter Unit (TLU), configured to provide the maximum rotation position of the rudder;
   a Flight Augmentation Computer configured to monitor the current rudder bar position value of the rudder bar provided by the ELAC system so as to be able to detect when the rudder bar reaches an extreme position, for which the rudder reaches one of its maximum rotation positions as provided by the TLU, and when such a situation is detected to check whether, within a predetermined time period after the detection of reaching the extreme position, the following alarm activation conditions are met:
      the rudder successively returns to a neutral position and the rudder re-exits from the neutral position in any direction;
   wherein the current position of the rudder is verified in relation to the neutral position, a predetermined limit is set on a neutral position value for detection of the neutral position, and the current rudder bar position value of the rudder bar is compared to the neutral position value which corresponds to a fraction of a position value representative of the maximum rotation position of the rudder; and
   an alarm unit configured to emit an alarm when said alarm activation conditions are met during said predetermined time period based on the comparison of the current rudder bar position value and the neutral position value.

10. The device as claimed in claim 9, wherein said alarm unit emits, simultaneously, a visual alarm and a sound alarm.

11. The device as claimed in claim 9, further comprising logic circuitry and sensor inputs configured to inhibit said alarm unit upon detection of certain predetermined criteria.

12. The device as claimed in claim 11, wherein
   the predetermined criteria include at least one of the following conditions:
      aircraft speed is below a predetermined speed threshold,
      a failure of at least one engine of the aircraft,
      no valid rudder bar position value of the rudder bar is available from the ELAC system.

13. An aircraft directional control system, comprising:
   at least one rudder bar configured to be actuated by a pilot of the aircraft,
   at least one Elevator Aileron Computer (ELAC) system, configured to provide a current position of the rudder bar with an electric command signal representing the current position of the rudder bar, and
   a flight control computer which receives this electric command signal and automatically generates a control command which is transmitted to an actuator of a rudder of the aircraft,
   an alarm device for avoiding inappropriate actuation of the rudder bar of the aircraft by the pilot, the rudder bar configured to be moved in two opposite directions by the pilot to control the rudder, the rudder being able to turn in two directions of rotation up to a maximum rotation position in each of the two directions of rotation, one of the two opposite directions of the rudder bar being associated with one of the directions of rotation of the rudder and the other direction of the rudder bar being associated with the other direction of rotation of the rudder, comprising:
   the at least one ELAC system, configured to provide the current position of the rudder bar;
   a Travel Limiter Unit (TLU), configured to provide the maximum rotation position of the rudder;
   a Flight Augmentation Computer configured to monitor the current position of the rudder bar provided by the ELAC system so as to be able to detect when the rudder bar reaches an extreme position, for which the rudder reaches one of its maximum rotation positions as provided by the TLU, and when such a situation is detected to check whether, within a predetermined time period after the detection of reaching the extreme position, the following alarm activation conditions are met:
      the rudder successively returns to a neutral position and the rudder re-exits from the neutral position in any direction;
   wherein the current position of the rudder is verified in relation to the neutral position, a predetermined limit is set on a neutral position value for detection of the neutral position, and the current position of the rudder bar expressed in a current rudder bar position value is compared to the neutral position value which corresponds to a fraction of a position value representative of the maximum rotation position of the rudder; and
   an alarm unit configured to emit an alarm when said alarm activation conditions are met during said predetermined time period based on the comparison of the current rudder bar position value and the neutral position value.

* * * * *